United States Patent [19]

Matzelle et al.

[11] Patent Number: 5,007,746
[45] Date of Patent: Apr. 16, 1991

[54] THRUST BEARING WITH RESILIENT RETENTION TANG

[75] Inventors: Albert J. Matzelle, Howell; William E. Scheerer, St. Johns, both of Mich.

[73] Assignee: Federal-Mogul Corporation, Southfield, Mich.

[21] Appl. No.: 457,139

[22] Filed: Dec. 26, 1989

[51] Int. Cl.⁵ .................... F16C 17/04; F16C 33/10
[52] U.S. Cl. .................... 384/420; 384/429; 384/621
[58] Field of Search ............ 384/103, 105, 106, 243, 384/223, 248–251, 275, 288, 294–296, 303, 305, 368, 420–430, 618, 620–622, 626

[56] References Cited

U.S. PATENT DOCUMENTS

| | | | |
|---|---|---|---|
| 3,597,027 | 8/1971 | Herndon | 384/305 |
| 3,972,574 | 8/1976 | Pitner | 384/621 |
| 4,042,285 | 8/1977 | Dorsch | 384/621 |
| 4,293,170 | 10/1981 | Brezosky | 384/275 |
| 4,310,205 | 1/1982 | Condon, Jr. et al. | |
| 4,770,547 | 9/1988 | New | 384/429 |
| 4,783,183 | 11/1988 | Gardella | 384/622 X |
| 4,795,220 | 1/1989 | Mori | 384/420 |

FOREIGN PATENT DOCUMENTS

| | | | |
|---|---|---|---|
| 246424 | 11/1987 | European Pat. Off. | 384/420 |
| 2638996 | 3/1978 | Fed. Rep. of Germany | 384/429 |
| 2920818 | 12/1980 | Fed. Rep. of Germany | 384/429 |

Primary Examiner—Thomas R. Hannon
Attorney, Agent, or Firm—Lawrence J. Shurupoff

[57] ABSTRACT

A thrust bearing is provided with resilient mounting tangs in the form of one or more axially and radially projecting leaf springs. Each leaf spring is shaped with a wedge-like camming surface which facilitates the insertion and centering of each tang within a mounting recess formed in a bearing housing. As the tang is wedged and cammed within its mounting recess, the leaf spring is resiliently deflected and compressed therein to securely anchor the bearing in place.

6 Claims, 1 Drawing Sheet

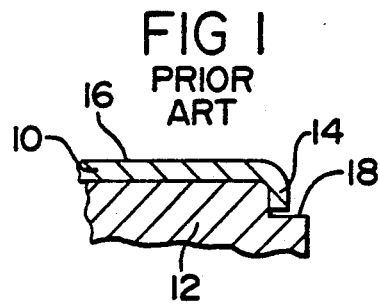
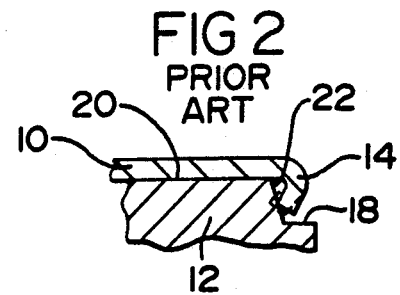
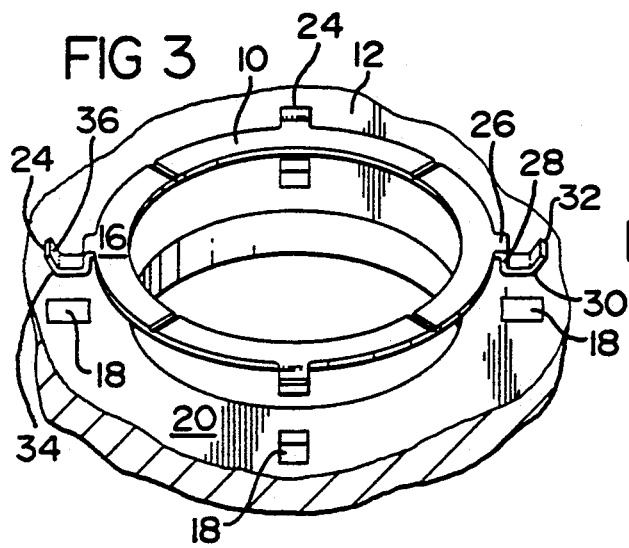
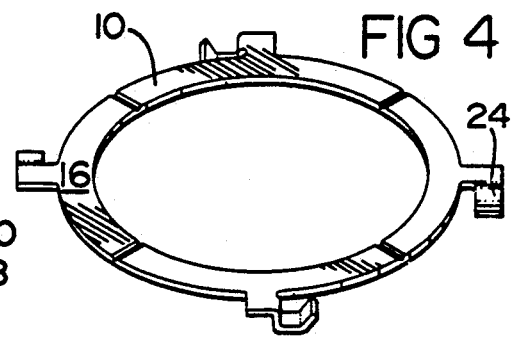
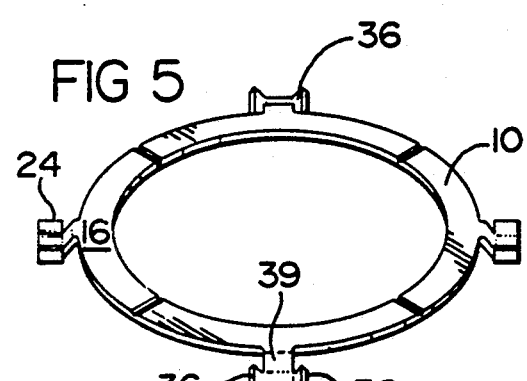
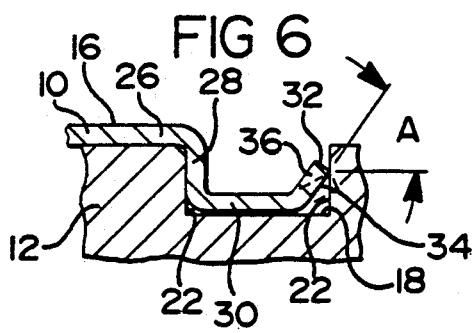
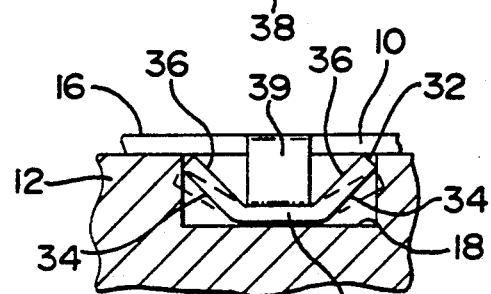
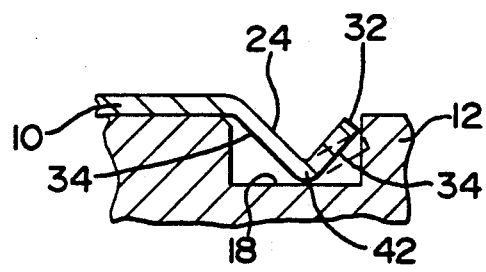

THRUST BEARING WITH RESILIENT RETENTION TANG

BACKGROUND OF THE INVENTION

1. Field of the Invention

The present invention relates generally to thrust washers and thrust bearings and particularly concerns thrust washers and thrust bearings provided with stamped resilient projections serving as locating and retaining springs.

2. Description of Prior Developments

Thrust washers and thrust bearings have previously been formed with one or more locating members such as tabs, lugs and tangs. These locating members are provided for preventing the washers and bearings from rotating during operation as well as for orienting and properly locating the washers and bearings in an assembly such as a transmission housing or engine crankcase. Thrust bearings of this general type are disclosed in U.S. Pat. Nos. 4,795,220 and 4,770,547.

With some conventional thrust bearing designs, the washer-shaped bearing can become dislodged if the component upon which it is seated is inverted, turned upside down or otherwise manipulated during various assembly operations. To correct this problem, grease or a similar tacky substance has been applied to the interface between the bearing and its support surface to hold the bearing in place during assembly.

Another approach to securing thrust bearings in place during assembly is to form a mechanical non-yielding fit between the locating tangs provided on the bearings and the bearing housing mounting surfaces, recesses or pockets on or within which the tangs are seated. This is the approach followed in U.S. Pat. No. 4,770,547 noted above. This approach can in some cases require costly machining of the bearing support housing to provide the required pockets or recesses for the locating tangs.

Moreover, in those cases where the pockets or seats for the locating tangs are cast into the bearing housing, excessive and often unacceptable tolerances are experienced between the tangs and the as-cast mounting surfaces. This condition can result in inadequate retention forces or excessive interference between the bearing tangs and bearing housing mounting surfaces. Inadequate retention forces cause the bearing to become easily dislodged from its housing, while excessive interference can distort the bearing and/or prevent proper seating of the bearing in its housing.

As seen in FIG. 1 as well as in U.S. Pat. 4,770,547, some locating tabs have been bent through an angle of about 90°. Although these tabs will hold the bearing in place in some cases, such tabs do not provide a resilient or biased retention force required for robotic assembly operations. Some designs increase the bend angle to greater than 90° so that the tab is placed in tension as it engages the side wall of its mounting recess and is bent back toward a 90° bend as seen in FIG. 2. The amount of bend past 90° is limited by the ability to remove the tab from its forming die after bending. A particular drawback to this design is that it can result in the sharp corners of the free end of the tab digging into the bearing mounting surface and obstructing installation of the bearing.

Accordingly, a need exists for a thrust bearing having a self-locking tang which positively and resiliently retains the bearing within its housing, yet which is easily removed from its die during stamping and forming.

Another need exists for a thrust washer which does not require any secondary machining on itself or on its mounting surface or housing so that it may be directly mounted to an as-cast surface or as-cast housing.

Still another need exists for a thrust bearing which does not require grease or a similar tacky substance to retain the thrust bearing on its mounting surface.

Yet another need exists for a thrust bearing having resilient mounting tangs which accommodate significant assembly tolerances yet which are easily insertable within their mounting recesses without requiring excessive insertion force.

Another need exists for a thrust bearing which facilitates its assembly to a bearing housing by providing a self-centering profile which guides the thrust bearing with a compressive resilient wedging action into its proper seating position without digging or plowing into the bearing mounting surface during installation.

SUMMARY OF THE INVENTION

The present invention has been developed to fulfill the needs noted above and therefore has as a primary object the provision of a washer-shaped thrust bearing having locating and retaining tangs which resiliently engage recesses or pockets formed within a bearing housing.

Another object of the invention is the provision of a stamped thrust bearing having resilient retention tangs which are easily removed from their stamping die.

Yet another object of the invention is the provision of a thrust bearing having resilient retention tangs which accommodate significant assembly tolerances through elastic and/or minor plastic deformation of the retention tangs.

Briefly, the invention includes a stamped, washer-shaped thrust bearing having one or more locating and retaining tangs radially projecting from a ring-shaped thrust-receiving body. Each tang is dimensioned to be resiliently compressed within a recess or pocket formed within or adjacent to a bearing housing or bearing mounting surface.

In order to accommodate large assembly tolerances as well as as-cast surfaces and/or as-cast tang receiving pockets, the tangs are shaped with relatively large wedge-like chamfered profiles and are dimensioned to accommodate relatively large elastic deformation as well as minor plastic deformation upon insertion within the tang-receiving pockets. These chamfered profiles facilitate insertion of the tangs within recesses in the bearing housing by providing a wedge-like insertion action while preventing excessive insertion forces previously caused by non-yielding interference fits between the tangs and housing.

BRIEF DESCRIPTION OF THE DRAWINGS

Various other objects, features and attendent advantages of the present invention will be more fully appreciated from the following detailed description when considered in connection with the accompanying drawings, in which the same reference numbers designate the same or corresponding parts throughout.

FIGS. 1 and 2 are fragmental sectional views through a thrust bearing locating tang and bearing housing according to the prior art;

FIGS. 3, 4 and 5 are perspective views of alternate embodiments of thrust washers formed according to the present invention;

FIG. 6 is a fragmental sectional view taken through the retention tang of FIGS. 3 and 4, as installed within a recess formed in a bearing housing;

FIG. 7 is a fragmental sectional view taken through the retention tang of FIG. 5, as installed within a recess formed in a bearing housing; and FIG. 8 is a fragmental sectional view of an alternative configuration of a mounting tang, as installed within a recess formed in a bearing housing.

DETAILED DESCRIPTION OF THE PREFERRED EMBODIMENTS

In order to better appreciate the advantages of the present invention, a discussion of the prior art shown in FIGS. 1 and 2 may be helpful. As seen in these Figures, a generally flat, annular thrust bearing 10 of the general shape shown in FIG. 3, is mounted or located upon a bearing housing 12 via one or more locating tangs 14. Housing 12 can take the form of an engine crankcase, transmission housing, or similar power train element. Each tang 14 is typically bent at a 90° angle to the radial plane of the bearing surface 16 as seen in FIG. 1, and fitted within a recess or mounting surface 18 formed in bearing housing 12.

While the assembly of FIG. 1 is adequate for some assembly operations, it can not provide sufficient retention force to prevent the bearing from becoming dislodged by rapid assembly movements or by gravity in those cases where the housing is turned upside down. In order to prevent this dislodgment, the bearing shown in FIG. 2 is formed with tangs 14 bent through an angle of greater than 90°. As these tangs are inserted within chamfered recesses 18, they are deformed outwardly from their unstressed configuration as shown in phantom. This resilient engagement will hold the bearing in place during assembly operations but it is not well suited to large variations or tolerances in the positions of the recesses 18.

That is, as tang 14 in FIG. 2 initially engages support surface 20 of the bearing housing 12, it will bite into the support surface and either prevent the seating of the bearing on the housing or result in distortion of the bearing. If the tang 14 does not engage support surface 20 or the sloping or chamfered side wall 22 of recess 18, the bearing will not be positively retained. The present invention has been designed to avoid these problems by providing one or more wedge-like resilient camming surfaces which resiliently guide the thrust bearing tangs into their proper seating locations.

In accordance with the present invention, in order to accommodate large assembly tolerances, particularly on the location of the recesses 18, yet provide adequate retention forces during assembly, bearing 10 as seen in FIGS. 3, 4 and 5 is formed with retention tangs 24 which are dimensioned to form a resilient compressive fit within recesses 18 or similar engagement surfaces formed in or on bearing housing 12. More particularly, as seen in FIGS. 3 and 6, tangs 24 project radially outwardly from annular bearing body 10. Although four equally spaced tangs are shown, only one tang may be required in certain applications. If more than one tang is used, several tangs may be asymmetrically located around bearing body 10 to orient and key the bearing in place in corresponding or matching mounting recesses 18.

Each tang in FIGS. 3 and 6 is formed with a radial portion 26 located in the same plane as the bearing surface 16 of bearing body 10. An axial portion 28 forms a first tang leg which extends from the radial portion 26 and leads axially away from bearing surface 16 to a second radially extending tang portion 30 which is axially offset from the plane of the surface 16 of bearing body 10. The free end 32 of tang 24 is bent back toward the plane of bearing body 10 from radial portion 30 to form a second tang leg.

Preferably, the free end 32 of tang 24 is bent at an acute angle A with respect to the plane or surface 16 of bearing body 10 so as to form a relatively large chamfered surface 34 extending between the second radial tang portion 30 and free end 32. Surface 34 is formed on the bottom of a cantilevered leaf spring projection 36 which is dimensioned to engage side wall 22 of recess 18 with a resilient biased interference fit.

Projection 36 is further dimensioned to be compressed or resiliently deflected toward axial portion 28 as tang 24 is inserted within pocket or recess 18. This compression of projection 28 provides a wedging action between tang 24 and recess 18 which serves to securely anchor the bearing on its housing. Additional mounting forces are generated between axial portion 28 and its side wall 22 as side wall 22 reacts the compressive forces generated by leaf spring projection 36.

It can be appreciated that the configuration of tang 24 not only facilitates the initial placement and entry of the tang within the recess, but also accommodates large tolerances between the alignment of the bearing body 10 and tangs 24 and the recesses 18 on housing 12. Specifically, the large chamfer provided by surface 34 serves as a guide surface which provides a self-centering wedging action to each tang as it is inserted within a corresponding recess. This is a particular advantage in the case of robotic assembly of the bearing to the housing.

Without this resilient accommodation of manufacturing tolerances between the bearing and housing, as well as accommodation of minor misalignments produced during assembly by robotic assemblers, non yielding interference fits can result and cause damage to the thrust bearings and prevent the proper seating of the tangs within their mounting recesses. These problems are avoided by forming each tang with the wedge-like camming surface 34 which resiliently guides and centers each tang within its mounting recess while preventing sharp corners on the free end 32 from biting into the mounting recesses 18 during insertion. By orienting free end 32 in a direction pointing generally away from recess 18 during installation, the sharp corners of free end 32 are prevented from digging into the walls of the recess.

An alternate tang design is shown in FIG. 4 wherein each tang 24 is configured to be compressed in a direction generally tangential to the bearing body 10 as opposed to the generally radially directed compression shown in FIG. 3. FIG. 6 depicts the general fit of the tang within the recess for both tang configurations shown in FIGS. 3 and 4.

Another tang design is shown in FIGS. 5 and 7 wherein each tang 24 is formed with a pair of cantilevered leaf springs 36 projecting from opposed ends of a central tang portion 38 which is axially and radially offset from bearing surface 16 of bearing body 10 via mounting leg 39. This design accommodates even greater tolerances by providing two, rather than one, chamfered camming and wedging surfaces 34.

Another alternative tang design is shown in FIG. 8 wherein the tang 24 is formed with a generally V-shaped cross section so as to provide a pair of resilient camming and wedging surfaces 34 which diverge outwardly from apex 42. This design provides greater tolerance accommodation than the single chamfer design of FIGS. 3 and 4. However, with this design at least a pair of circumferentially spaced tangs 24 is required to react or offset the circumferential forces created by the circumferential deflection of each free end 32.

Bearing body 10 and tangs 24 may be die stamped as a one-piece component from any suitable metallic material or bearing alloy including copper, lead and bronze alloys. Because no single bend of more than 90° is required to fabricate the bearing body and tangs from flat stock material, the bearing body and tangs may be easily removed or ejected from their forming dies. However, because each free end 32 of each tang 24 is oriented to dig into the side walls of its mounting recesses upon being pulled or forced outwardly from the recess, the free end 32 acts as a ratchet to facilitate insertion and prevent removal of the tang from the recess.

Obviously, numerous modifications and variations of the present invention are possible in light of the above teachings. It is therefore to be understood that within the scope of the appended claims, the invention may be practiced otherwise than as specifically described herein. For example, bearing body 10 may be formed as two 180°, three 120° or more separate components, each provided with one or more tangs 24. Moreover, tangs 24 may project radially inwardly from bearing body 10, rather than radially outwardly as shown in the Figures.

What is claimed is:

1. A thrust bearing adapted for positive spring-biased retention within a bearing housing, said bearing comprising;
   a bearing body; and
   resilient mounting means projecting from said bearing body, said mounting means comprising a pair of resilient spring projections diverging outwardly from a central portion, each one of said pair of spring projections having a free end portion cantilevered about said bearing body, said spring projections each comprising at least one chamfered camming surface for engaging said housing, for deflecting said spring projections, and for forming a spring-biased engagement between said spring projections and said housing.

2. The bearing of claim 1, wherein said bearing body and said mounting means are stamped from a die as a one-piece bearing.

3. The bearing of claim 1, wherein said mounting means comprises a tang having a V-shaped cross section.

4. The bearing of claim 1, wherein said spring projections project at an acute angle with respect to said bearing body.

5. A thrust washer adapted for positive, spring-biased retention on a housing, said washer comprising:
   a planar bearing body comprising a thrust surface defining a radial plane; and
   at least one retention tang projecting from said bearing body, said retention tang comprising a first leg extending away from said radial plane and a second leg extending toward said radial plane, said second leg comprising a cam surface for resiliently engaging said housing to facilitate said spring biased retention.

6. The thrust washer of claim 5, wherein said first and second legs form a wedge means for wedging said retention tang against said housing.

* * * * *